United States Patent
Barraza Enciso et al.

(10) Patent No.: US 11,651,080 B2
(45) Date of Patent: May 16, 2023

(54) SENTIMENT ANALYSIS FOR SECURING COMPUTER CODE

(71) Applicant: Bank of America Corporation, Charlotte, NC (US)

(72) Inventors: Maria Carolina Barraza Enciso, New York, NY (US); Michael Ogrinz, Easton, CT (US); Elena Kvochko, New York, NY (US)

(73) Assignee: Bank of America Corporation, Charlotte, NC (US)

( * ) Notice: Subject to any disclaimer, the term of this patent is extended or adjusted under 35 U.S.C. 154(b) by 475 days.

(21) Appl. No.: 16/741,892

(22) Filed: Jan. 14, 2020

(65) Prior Publication Data

US 2021/0216642 A1    Jul. 15, 2021

(51) Int. Cl.
*G06F 21/57* (2013.01)
*G06N 3/02* (2006.01)
*G06N 20/00* (2019.01)
*G06F 40/284* (2020.01)

(52) U.S. Cl.
CPC .......... *G06F 21/577* (2013.01); *G06F 40/284* (2020.01); *G06N 3/02* (2013.01); *G06N 20/00* (2019.01)

(58) Field of Classification Search
CPC .... G06F 21/563; G06F 21/577; G06F 21/552; H04L 63/1416; H04L 63/1433
See application file for complete search history.

(56) References Cited

U.S. PATENT DOCUMENTS

| | | | |
|---|---|---|---|
| 1,026,199 | A | 5/1912 | Bullard |
| 8,578,499 | B1 * | 11/2013 | Zhu ...................... G06F 21/567 |
| | | | 713/188 |
| 9,282,070 | B2 | 3/2016 | Haugen et al. |
| 9,471,883 | B2 | 10/2016 | Chatterjee et al. |
| 10,007,661 | B2 | 6/2018 | Arquero et al. |
| 10,031,909 | B2 * | 7/2018 | Blaschak ............... H04L 51/32 |
| 10,050,926 | B2 | 8/2018 | Ebersman et al. |
| 10,353,898 | B2 | 7/2019 | Kawecki, III |

(Continued)

OTHER PUBLICATIONS

Gupta et al., "Twitter Sentiment Analysis: An Examination of Cybersecurity Attitudes and Behaviors," http://aisel.aisnet.org/sigdsa2016, Dec. 11, 2016.

(Continued)

*Primary Examiner* — Dao Q Ho
(74) *Attorney, Agent, or Firm* — Weiss & Arons LLP

(57) ABSTRACT

Systems and methods for implementing sentiment analysis of computer code are provided. Developers who write source code may include comments or other natural language artifacts in the source code. These artifacts may be illustrative of current or legacy cybersecurity threats. Systems and methods may mine comments, and/or other code artifacts, for the dual purposes of cybersecurity threat detection and mitigation. Advanced code analytics may be leveraged for a deeper understanding of the sentiments expressed by the artifacts. Such sentiment may include negative sentiments expressed in error code selection and/or descriptions. All information retrieved is preferably human identity agnostic in line with personal data regulation compliance.

20 Claims, 9 Drawing Sheets

(56) References Cited

U.S. PATENT DOCUMENTS

| | | | | |
|---|---|---|---|---|
| 2013/0145472 | A1* | 6/2013 | Ramabhatta | H04L 63/145 726/25 |
| 2014/0337257 | A1* | 11/2014 | Chatterjee | G06N 20/00 706/12 |
| 2016/0180096 | A1* | 6/2016 | Sharma | G06F 21/577 726/25 |
| 2016/0246965 | A1* | 8/2016 | Cornell | G06F 21/577 |
| 2017/0185921 | A1* | 6/2017 | Zhang | G06N 20/00 |
| 2018/0089171 | A1* | 3/2018 | Arquero | H04L 51/22 |
| 2018/0176243 | A1* | 6/2018 | Arnaldo | H04L 63/1425 |
| 2019/0132344 | A1* | 5/2019 | Lem | G06N 5/022 |
| 2020/0142674 | A1* | 5/2020 | Hernan | G06F 9/541 |
| 2021/0149788 | A1* | 5/2021 | Downie | G06F 11/366 |
| 2021/0216642 | A1* | 7/2021 | Barraza Enciso | G06N 3/02 |

OTHER PUBLICATIONS

Karami et al., "Mining Public Opinion about Economic Issues: Twitter and the U.S. Presidential Election," https://www.researchgate.net/publication/322873722_Mining_Public_Opinion_about_Economic_Issues_Twitter_and_the_US_Presidential_Election, Feb. 2018.

Deb et al., "Predicting Cyber Events by Leveraging Hacker Sentiment," https://www.researchgate.net/publication/324558339_Predicting_Cyber_Events_by_Leveraging_Hacker_Sentiment, Apr. 14, 2018.

"Common Cyber Threats: Indicators and Countermeasures," Cybersecurity Awareness, Retrieved on Dec. 23, 2019.

"Sentiment Analysis: The Only Guide You'll Ever Need," https://monkeylearn.com/sentiment-analysis/, MonkeyLearn Inc., Retrieved on Oct. 24, 2019.

Hemandez-Suarez et al., "Social Sentiment Sensor in Twitter for Predicting Cyber-Attacks Using Regularization," https://www.ncbi.nlm.nih.gov/pmc/articles/PMC5982517/, Apr. 29, 2018.

Saif et al., "Evaluation Datasets for Twitter Sentiment Analysis," https://pdfs.semanticscholar.org/831e/3f18d25cc65b6cd18f21ca5ad57bdc53cfce.pdf?_ga=2.98713054.1155872797.1583514514-1478280383.1568828177, Retrieved on Dec. 16, 2019.

Shu et al., "Understanding Cyber Attack Behaviors with Sentiment Information on Social Media," https://www.researchgate.net/publication/323655573_Understanding_Cyber_Attack_Behaviors_with_Sentiment_Information_on_Social_Media, Mar. 2018.

Parul Pandey, "Sentiment Analysis is Difficult, but AI May Have an Answer," https://towardsdatascience.com/sentiment-analysis-is-difficult-but-ai-may-have-an-answer-a8c447110357, Aug. 6, 2019.

Jia Wertz, "Why Sentiment Analysis Could Be Your Best Kept Marketing Secret," https://www.forbes.com/sites/jiawertz/2018/11/30/why-sentiment-analysis-could-be-your-best-kept-marketing-secret/#/5ba6b3672bbe, Nov. 30, 2018.

* cited by examiner

```
                                                                    ~200 private JustInCaseFunction;            ~201
private ConnectionOptions = Internet;  ~205
{         ~203                                         ~207
message: "Please connect to the internet for full functionality of this program",
};                                                                    ~209
// Enables important sms functionality to interact directly with a user device.

(          ~211
public UserDeviceService
private UserDeviceID;~213
private ShowMessage;
private NetworkID;~215
)

{
translate.setDefaultLang('en');        ~217
SMS.push('SMS_MESSAGE.NO_INTERNET_CONNECTION').display
    (
        value    =>
{
   this.         InternetConnection = this.create.connection({
                            ~219
             document.recent_finance_transactions = display.UserDeviceID;
//if the user submits another request, tell user to turn on data connection
:-) ~223                                                        ~221
        message    : ~225
'Uh This is the second time NO_INTERNET_CONNECTION'),
        position    : 'bottom',
        showCloseButton    : true
}
    );
}
);
```

FIG. 2

| Cross Reference to FIG. 2 | Extracted Artifact | Artifact Class | Cybersecurity Topic | Sentiment Polarity |
|---|---|---|---|---|
| 201 | JustInCaseFunction | Function Name | Unpatched or Outdated Software Vulnerabilities | High |
| 203 | ConnectionOptions | Function Name | DDoS attacks | Neutral |
| 205 | Internet | Function Name | DDoS attacks | Neutral |
| 207 | Please connect to the internet for full functionality of this program | Message Text | Malicious Code | Neutral |
| 209 | Enables important sms functionality to interact directly with a user device. | Comments | Phishing and Spear Phishing | High |
| 211 | UserDeviceService | Function Name | Malicious Code | Neutral |
| 213 | UserDeviceID | Function Name | account hijacking | Neutral |
| 215 | NetworkID | Function Name | account hijacking | Neutral |
| 217 | SMS_MESSAGE.NO_INTERNET_CONNECTION | Message Text | Phishing and Spear Phishing | High |
| 219 | document.recent_finance_transactions | File Name | Data breaches | Neutral |
| 221 | if the user submits another request, tell user to turn on data connection | Comments | DDoS attacks | High |
| 223 | ;-) | Emoticon | Topical modifier | High |
| 225 | Uh_This_is_the_second_time.NO_INTERNET_CONNECTION | Function Name | DDoS attacks | High |

FIG. 3

SENTIMENT ANALYSIS FOR SECURING COMPUTER CODE

FIELD OF TECHNOLOGY

This application describes apparatus and methods for sentiment analysis.

BACKGROUND

Source code is the blueprint for computer applications. Source code may be written in a variety of different computer languages. Examples of such languages include Java™, C++™ and C#.

Source code is typically written by human developers. Developers that write source code may include comments or other natural language artifacts in the source code.

At times, developers may include artifacts in comments included in the code. These artifacts may be indicative of the mood, ideas, temperament or attitude of the developer.

It may be desirable to mine the comments in order to identify the mood, ideas, temperament or attitude of the developer. It may be further desirable to utilize the identified mood, ideas, temperament or attitude to further identify malicious activities of the developer.

Cybersecurity attacks have become a serious threat with detrimental effects on individuals, businesses, and broader society. However, detecting and predicting the occurrence of such attacks is difficult.

It is also difficult to predict a target of a cyberattack. Cyberattacks may be perpetrated anonymously and without clear motivations.

It would be desirable to predict which source code files that are vulnerable to and/or host cybersecurity threats. It would also be desirable to provide improved predictive insights that identify source code files that involve a cyberattack.

BRIEF DESCRIPTION OF THE DRAWINGS

The objects and advantages of the disclosure will be apparent upon consideration of the following detailed description, taken in conjunction with the accompanying drawings, in which like reference characters refer to like parts throughout, and in which:

FIG. 2 shows illustrative source code in accordance with principles of the disclosure;

FIG. 3 shows an illustrative lexicon-based dictionary in accordance with principles of the disclosure;

DETAILED DESCRIPTION

Figure 1:
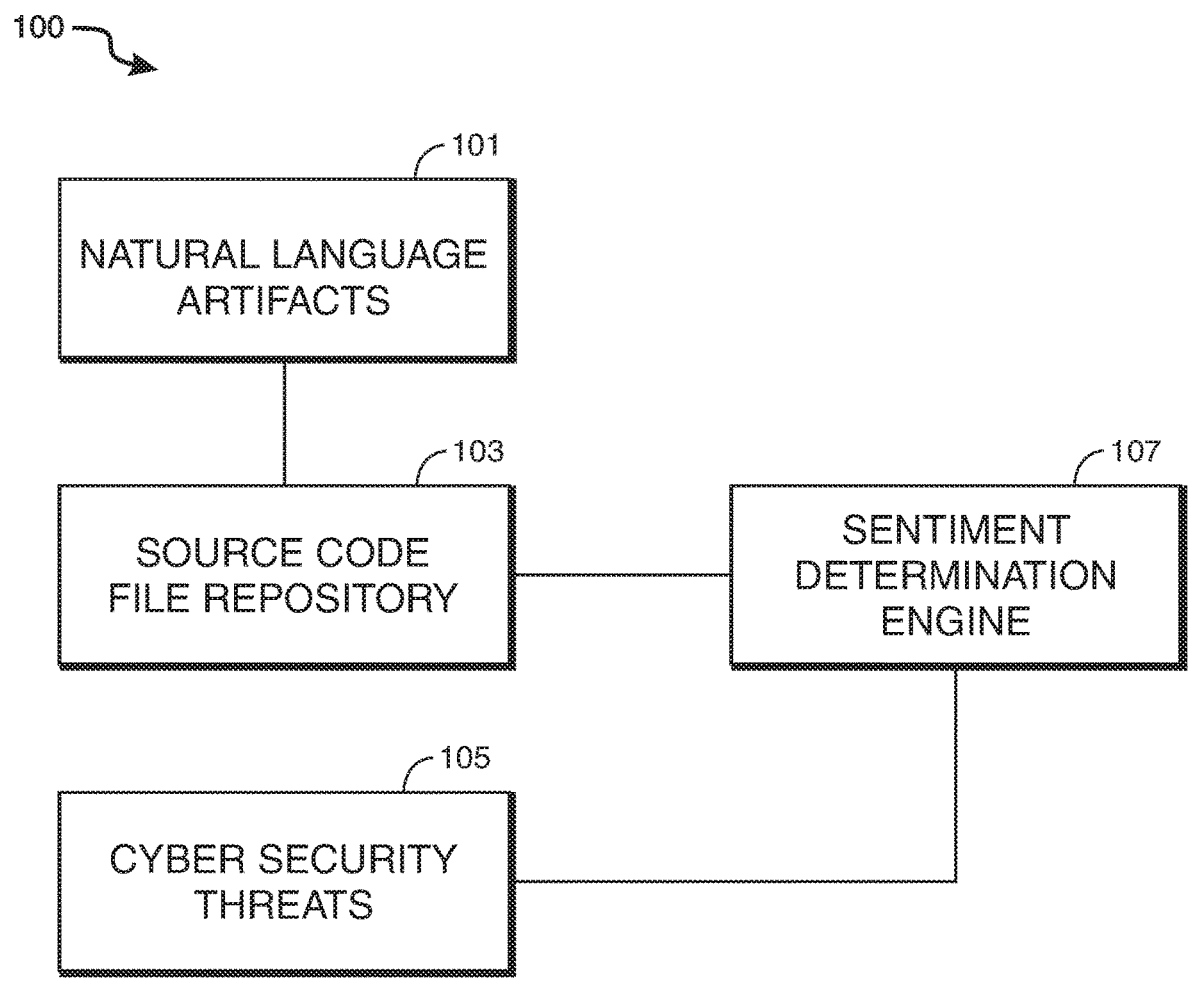
FIG. 1 shows an illustrative system in accordance with principles of the disclosure.

Systems and methods for implementing sentiment analysis of computer code are provided. Developers who write source code may include comments or other natural language artifacts in the source code. These artifacts may be correlated to current or legacy cybersecurity threats.

Systems and methods may mine comments, and/or other natural language artifacts, for the dual purposes of cybersecurity threat detection and mitigation. Advanced code analytics may be leveraged for a deeper understanding of the sentiments expressed by the artifacts. Such sentiment analysis may derive negative cybersecurity sentiments expressed in error code selection and/or descriptions. All information retrieved is preferably human identity agnostic, in line with personal data regulation compliance.

Sentiment analysis may include determining subject, opinion and polarity of natural language artifacts included in a source code file. Subject may refer to determining a topic being discussed by the artifact. Polarity may be defined as whether the artifact expresses a positive or negative opinion. Sentiment analysis may be defined as the "computational study of opinions, feelings and subjectivity in text." Pang & Lee (2008).

Even using computerized sentiment analysis, it is difficult to successfully interpret written expressions such as word pairs, word tuples, emoticons, slang, sarcasm, irony, questions, URLs, code, idioms (e.g., "raining cats and dogs," "see the light," "shoot an email," "dead link") and inversions (small is good for portable electronics).

Such technical challenges—i.e., determining written expressions within the text—are further compounded when attempting to perform computerized sentiment analysis on source code files. Source code files are written using different programming languages and are primarily functional, not expressive, texts.

Additionally, analyzing source code for sentiment is similar to analyzing text messages. Text message communications, especially text messages transmitted from young adults and teenagers, use a variety of slang terms and acronyms. Such slang terms and acronyms may compress and obfuscate the communications. Similarly, source code developers may obfuscate and abbreviate function and variable names.

Furthermore, sentiment analysis of communications may rely on context for identification of intent. However, contextualizing comments within source code, or source code itself, may be difficult because source code may be modularized and isolated from other code.

For example, a section of code may display, on a screen, the social security number and full name of an employee. This section of code may be a legitimate function of the system, or safe code, such as an employee verification page. However, this section of code may also be a vulnerability of the system, or back door code, such as, a non-human-resources system initiating the display of the employee data page.

Therefore, a deeper analysis of the comments within source code and/or source code may be utilized. Such an analysis may include analyzing the intent of a specific section of code based on its context within a system. A section may be analyzed to determine if the section was written with positive intent or malicious intent.

The deeper analysis of the code may include analyzing what the source code is looking for on the target system. This may be because developers may be able to obfuscate their code and variable names in order to hide an attack or cybersecurity vulnerability. However, developers are unable to hide what the source code is looking for on the target system. For example, in a brute force login attack, the developer has no choice but to explicitly look for a "login successful" message or predetermined success code. Therefore, scanning the source code to identify what the source code looks for may be useful in addition to scanning what syntax is being used.

The proximity of certain sentiment red flags to certain checked values may impact scoring levels. Such sentiment red flags may include source code comments such as "we got you," "heh heh" or any other suitable comments that contextually, express negative sentiments. Such checked values may include a successful login code, predetermined success code, successful execution code, "login successful" or any other suitable checked values.

In the following example, negative sentiment expressed adjacent to the line of code that indicates a successful login may be more suspicious and/or more malicious than an isolated negative comment.

Example

String checkVal=sysCall(nodeVal); //Heh Heh
If ("Login successful").equals(checkVal){//heh heh
At times, investigation of the code itself can be performed to determine if a code section was written with a good intent or a bad intent.

Methods for automated detection of source code vulnerable to a cybersecurity threat are provided. Cybersecurity may include information and communication technology that provide confidentiality, authentication and integrity for information. Cybersecurity may include information and communication technology that provide non-repudiation, access control and availability of information.

Cybersecurity threats may include distributed denial of service attacks, data breaches and account hijacking. Cybersecurity threats may include phishing and spear phishing. Phishing techniques use a transmitted message to deceive a recipient into disclosing personal information. It puts the recipient's personal information and an organization's information at risk. Spear phishing is a targeted type of phishing directed towards a specific individual or group of individuals.

Cybersecurity threats may include malicious code. Malicious code includes software that does damage and/or creates unwanted behaviors. Illustrative malicious code includes viruses, trojan horses, worms, keyloggers, spyware, rootkits or backdoors. A source code file may provide functionality that allows malicious code to enter a computer system: downloading e-mail attachments and files, visiting an infected or unsecure websites or use of removable media. For example, a rootkit may include software tools that utilize functionality provided by a source code file to enable an unauthorized user to gain control of a computer system without being detected. The rootkit may attempt to mask its existence on a host computer.

Cybersecurity threats may include weak and default passwords. The use of weak and default passwords may allow for unauthorized access to a restricted computer system. Weak passwords may include words found in the dictionary, significant and readily available information such as names, dates and cities. When there are no restrictions that require character diversity (e.g., all lower case letters), source code may allow users to provide weak passwords.

Cybersecurity threats may include source code that utilizes unpatched or outdated software. Such unpatched or outdated software may provide opportunities for unauthorized access to computer systems. Source code susceptible to unpatched and outdated software may be more vulnerable to unauthorized system access attempts, successful unauthorized system access, unauthorized data storage/transmission or unauthorized modifications to hardware/software running on a computer system.

Methods may include importing a source code file. Methods may include determining a programming language of the source code file. Methods may include determining the programming language based on a syntax used in the source code file.

Methods may include iterating through each line of the source code file. Methods may include extracting natural language artifacts embedded in the source code file. A natural language artifact may be a comment inserted by a developer into the source code file. These comments may be illustrative of current or legacy cybersecurity threats. For example, the comment may indicate that a logic flow or other process is being implemented to address a known or anticipated cybersecurity threat. The comment may express a sentiment of the developer with respect to the known or anticipated cybersecurity threat.

A natural language artifact may be an error message. A developer may chose text that is displayed to an end user when an error condition is triggered. The text of the error message may express a sentiment of the developer with respect to a known or anticipated cybersecurity threat. The text of the error message when displayed to the end user may elicit a sentiment with respect to a known or anticipated cybersecurity threat.

A natural language artifact may be a variable identifier. For example, a developer may assign a name to a variable using natural language. The variable name may be formulated using natural language. The variable name may indicate a sentiment of the developer with respect to a known or anticipated cybersecurity threat.

A natural language artifact may be a file name. For example, a file name may be formulated using natural language to describe contents or function of a file. The text of the file name may indicate a sentiment of the developer with respect to a known or anticipated cybersecurity threat.

For each extracted artifact, methods may include locating source code associated with the artifact. Methods may include determining whether the source code associated with the artifact is vulnerable to a cybersecurity threat. Vulnerability may be determined based on whether the artifact relates contextually or topically to a cybersecurity threat. An artifact may relate to a cybersecurity threat when a sentiment associated with the artifact indicates a concern with respect to a known or anticipated cybersecurity threat.

For example, vulnerability may be determined based on a polarity of an artifact. Polarity may include whether the artifact is conveying a negative or positive (e.g., alarmed vs. confident) sentiment regarding a cybersecurity threat. Polarity may be positive, negative or neutral.

A positive polarity may express an opinion that a cybersecurity threat does not pose a risk to the source code. A negative polarity may express an opinion that a cybersecurity threat does pose a risk to the source code. A neutral polarity may be apathetic to whether the cybersecurity threat poses a risk to the source code. Vulnerability may be determined based on a polarity of the artifact.

Methods may include determining whether the source code file includes a threshold a threshold number of instances of vulnerable source code. The threshold number may correspond to artifacts that topically relate to a cybersecurity threat and are associated with a negative sentiment. For example, when the source code file includes a threshold number of artifacts that express a negative opinion about a cybersecurity threat, methods may quarantine the source code file.

Quarantining a source code file may include preventing execution of a computer program that includes the source code file. The source code file may be quarantined until the vulnerability of the source code file is reduced below threshold.

Methods may include generating a table correlating an artifact and a cybersecurity threat associated with the artifact. The table may also include an indicator of the sentiment expressed by the artifact with respect to the cybersecurity threat.

The table may be transmitted to the developer that wrote the source code file. The developer may be instructed to review each artifact associated with a negative sentiment. The developer may be instructed to re-evaluate source code or function calls in the source code file that have been determined to be vulnerable to a cybersecurity threat.

The developer may be instructed to harden source code with respect to a target cybersecurity threat. For example, if an artifact is associated with vulnerability to phishing, methods may include generating countermeasures that may reduce the vulnerability of the source code.

Illustrative countermeasures may include text that increases the positivity of messages presented to end users. Such positive message may encourage end users to be vigilant for phishing and spear phishing threats. Messages that increase end users' positive sentiments may include using words or phrases that advise, in an upbeat and encouraging fashion, users to proceed with caution when opening e-mail content.

Messages that increase end user's positive sentiments may include graphics or videos instead of solely text. Such messages may utilize videos or animation to convey to end users to be suspicious before clicking on suspicious links or attachments in e-mails. Such messages may include reminders to not call telephone numbers provided in suspicious e-mails or disclose any confidential information.

Countermeasures may include adding functionality to a source code file implementing spam filtering and quarantining of suspicious e-mails. Countermeasures may include adding functionality to source code that reports any potential phishing incidents.

Countermeasures may include adding functionality to source code for verifying that received messages include recognized digital signatures. Countermeasures may include adding functionality to source code that blocks malicious domains and/or unknown internet protocol ("IP") addresses. Countermeasures may include adding functionality to source code that deploys anti-virus software and regularly updates anti-virus definitions.

Illustrative countermeasures may increases the positivity regarding vulnerability of the source code file to malicious code. Countermeasures may include configuring a default setting to present e-mail messages in plain text. Such countermeasures may include disabling a preview pane for viewing e-mail messages. Countermeasures may include including functionality in the source code to scan all e-mail attachments for malicious code. Countermeasures may include adding code that deletes e-mail from unknown senders or disables automatic downloading of e-mails/attachments.

Countermeasures may include adding source code that blocks all unnecessary ports at a firewall and disables unused protocols and services. Countermeasures may include adding source code that ensures the source code stays current with all operating system service packs and software patches.

Methods may include determining an overall polarity of all the natural language artifacts embedded in the source code file. Based on the overall polarity, methods may include quarantining the source code file when source code file includes less than the threshold quantity of vulnerable code.

For example, the source code file may include less than a threshold quantity of source code vulnerable to specific cybersecurity threats. Based on the quantity of vulnerable code, the source code file would not be quarantined. However, an overall polarity of the collective natural language artifacts embedded in the source code file may be associated with a threshold level of negativity that itself is indicative of vulnerability to a cybersecurity threat. Due to this overall level of negativity, the source code file may be quarantined.

Methods may include determining a cybersecurity sentiment for the source code file. The cybersecurity sentiment may be a sentiment perceived by end users of a service provided by a product that includes the source code file. The cybersecurity sentiment may be a sentiment expected to be perceived by end users of the service. When negative cybersecurity sentiment and the threshold quantity of vulnerable code collectively exceed a threshold level, methods may include quarantining the source code file.

Methods may include locating source code associated with a natural language artifact. For example, an artifact may be used as a variable name. Source code that references the variable name may be considered to be associated with the artifact.

The locating may be performed based on a textual pattern shared by the artifact and the source code. For example, an artifact may include a target text pattern. The target text pattern may be associated with a negative cybersecurity sentiment. Variants of the text pattern may be used to name functions or used in comments in other parts of the source code file. The functions or comments that include variants of the target text pattern may be associated with the artifact.

The locating may be performed based on a functional relationship between the artifact and computer code. The artifact may include a text string that is passed from one function to another function. Code implementing either function may be associated with the artifact.

Methods may include forecasting a likelihood a source code file will be compromised by a potential cybersecurity threat. The forecasting may be based on an overall contextual relationship of natural language artifacts embedded in the source code file to potential cybersecurity threats. The forecasting may be based on a sentiment, regarding a cybersecurity thread, expressed by the natural language artifacts embedded in the source code file. The forecasting may be based on a polarity of sentiments expressed by the natural language artifacts embedded in the source code file.

Methods may determine when the forecasting indicates, above a threshold level, that the source code file is vulnerable to being compromised by the cybersecurity threat. In response to detecting that vulnerability is above the threshold level, methods may include quarantining the source code file. The quarantining may mitigate potential cybersecurity damage to the users of the source code file. The quarantining may mitigate potential cybersecurity damage to computer systems that run the source code file.

Apparatus for an automated detection software tool for quarantining source code is provided. The tool may detect source code determined to be vulnerable to a cybersecurity threat. The tool may include computer executable instructions. The computer executable instructions may be executed by a processor on a computer system.

The computer system may include one or more processor circuits. The processor circuits may control overall operation of the computer system and its associated components. A processor circuit may include hardware, such as one or more integrated circuits that form a chipset. The hardware may include digital or analog logic circuitry configured to perform any suitable (e.g., logical) operation.

Components of the computer system may include one or more of the following hardware components: I/O circuitry, which may include a transmitter device and a receiver device and may interface with fiber optic cable, coaxial cable, telephone lines, wireless devices, physical network layer hardware, a keypad/display control device or any other suitable encoded media or devices; peripheral devices, which may include counter timers, real-time timers, power-on reset generators or any other suitable peripheral devices; a logical processing device, which may compute data structural information, structural parameters of the data, quantify indices; and machine-readable memory.

Machine-readable memory may be configured to store information in machine-readable data structures. Computer system components may be linked by a system bus, wirelessly or by other suitable interconnections. Computer system components may be present on one or more circuit boards. In some embodiments, computer system components may be integrated into a single chip. The chip may be silicon-based.

Computer system components may include RAM, ROM, an input/output ("I/O") module and a non-transitory or non-volatile memory. The I/O module may include a microphone, button and/or touch screen which may accept user-provided input. The I/O module may include one or more of a speaker for providing audio output and a video display for providing textual, audiovisual and/or graphical output.

Software applications may be stored within the non-transitory memory and/or other storage medium. Software applications may provide instructions to the processor that enable a system component to perform various functions. For example, the non-transitory memory may store software applications used by the system, such as an operating system, application programs, and an associated database. Alternatively, some or all of computer executable instructions may be embodied in hardware or firmware components. The automated detection software tool may be a software application.

Software applications may include computer executable instructions for invoking functionality related to communication, such as email, short message service ("SMS"), and voice input and speech recognition applications. Software applications may utilize one or more algorithms that identify natural language artifacts in a source code file, determine a cybersecurity sentiment associated with an artifact and determine whether the cybersecurity sentiment renders the source code file vulnerable to a cybersecurity threat. Software applications may implement steps for quarantining vulnerable source code files, generate instructions for fortifying the source code file against cybersecurity threats or other suitable tasks.

Illustrative network connections utilized by computer system components may include a local area network ("LAN") and a wide area network ("WAN"), and may also include other networks. When used in a LAN networking environment, computer system components may be connected to the LAN through a network interface or adapter. Computer system components may include a communication circuit. The communication circuit may include a network interface card or adapter.

When used in a WAN networking environment, computer system components may include a modem, antenna or other circuitry for establishing communications over a WAN, such as the Internet. The communication circuit may include a modem and/or antenna. The physical network layer may provide communication pathways to move data between multiple sub-networks and/or other system components. Such communication pathways may be wired or wireless.

Exemplary wireless communication pathways may include satellite channels, Bluetooth signals, Wi-Fi, 3G, 4G, 5G communication channels and any other wired or wireless communication channel. The existence of any of various well-known protocols such as TCP/IP, Ethernet, FTP, HTTP and the like is presumed, and computer system components may be operated in a client-server configuration to permit a user to retrieve web pages from a web-based server. Web browsers can be used to display and manipulate data on web pages.

Computer system components may include a display, battery, speaker, and antennas. Computer system components may be portable devices such as a laptop, tablet, smartphone, other "smart" devices (e.g., watches, clothing having embedded electronic circuitry) or any other suitable device for receiving, storing, transmitting and/or displaying electronic information.

Computer system components may include a battery as a power source. For example, the battery may supply power to the display, the communication circuit and the processor circuit. In some embodiments, a computer system component may include a plurality of batteries. Computer system components may include solar panels that convert solar energy into electricity.

Computer system components may include, and may be operational with, numerous other general purpose or special purpose computing system environments or configurations. Examples of well-known computing systems, environments, and/or configurations that may be suitable for use with this disclosure include, but are not limited to, personal computers, server computers, handheld or laptop devices, tablets, "smart" devices, mobile phones and/or other personal digital assistants ("PDAs"), multiprocessor systems, microprocessor-based systems, set top boxes, programmable consumer electronics, network PCs, minicomputers, mainframe computers, distributed computing environments that include any of the above systems or devices, and the like.

Computer system components may utilize computer-executable instructions, such as program modules, executed by a processor. Generally, program modules include routines, programs, objects, components, data structures, etc. that perform particular tasks or implement particular abstract data types. Computer system components may be operational with distributed computing environments where tasks are performed by remote processing devices that are linked through a communications network. In a distributed computing environment, program modules may be located in both local and remote computer storage media including memory storage devices. Computer system components may rely on a network of remote servers hosted on the Internet to store, manage, and process data (e.g., "cloud computing" and/or "fog computing").

The automated detection software tool may include executable instructions, that when executed by a processor on a computer system, iterates through each line of a source code file. The tool may extract natural language artifacts from the source code file. For the extracted artifacts, the tool may be configured to determine a cybersecurity sentiment.

A cybersecurity sentiment may reflect an understanding of sentiments conveyed by the artifacts, with respect to cybersecurity threats. Within a source code file, developers may include natural language artifacts, such as text strings, that express feelings such as joy, happiness, anger, or frustration. Cybersecurity sentiments may be determined based on identifying and interpreting such sentiments expressed in a source code file. Cybersecurity sentiments may be correlated to source code considered to be vulnerable to a cybersecurity threat.

Sentiment may include words, word use, sentence structure, emoticons and punctuation. Illustrative positive emoticons may include :), :-), :), :D, or =). Illustrative negative emoticons may include :(, :-(, or : (. However, such emoticons must be considered in a context of other words associated with the emoticon.

The tool may be configured to determine a perceived cybersecurity sentiment of an end user of the source code file. For example, negative sentiments expressed by end users about a product that utilizes a source code file may indicate a higher probability that the product and/or source code file may be targeted in a cyberattack.

The tool may be configured to quarantine a source code file when a combined cybersecurity sentiment and perceived cybersecurity sentiment determined for the source code file is above a threshold negativity level. Negativity of the cybersecurity sentiment may be determined based on natural language artifacts included in the source code file. The tool may determine whether artifacts express positive or negative sentiments with respect to vulnerability of the source code file to a cybersecurity threat.

The tool may determine whether an artifact addresses a cybersecurity threat. The tool may determine relevance of an artifact to a cybersecurity threat based on a function performed by source code that includes the artifact. For example, source code may include a function name or comments indicating that associated code performs an unconventional operation. Source code may include a function name or comments indicating that code performs an operation in a manner that is vulnerable to a cybersecurity threat.

The tool may determine the presence of executable code in a file where it would not be normally present. For example, an image file, such as a .jpg, or sound file, such as an .mp4, typically does not contain executable code, such as an .exe file. However, such an artifact (image file or sound file) may be utilized to carry executable code as a payload in order to bypass traditional security measures. Therefore, determination of a file performing an unconventional operation, or determination of a file being located in an unconventional location may contextually indicate that the file is performing a malicious action, or is vulnerable to a cybersecurity threat.

The tool may also identify source code files that perform direct memory access. The tool may also identify source code files that perform mathematical operations directly on memory points. Identification of such source code files may indicate a malicious action or vulnerability.

The software tool may include computer executable instructions, that when executed by the processor on the computer system determines a cybersecurity sentiment for a first module of the source code file. The first module may be functionally linked to a second module. For example, the first module may pass information to the second module. The second module may open a network connection on behalf of the first module.

Based on the functional relationship linking the first module to the second module, the tool may apply the cybersecurity sentiment of the first module to the second module. Applying the cybersecurity sentiment of the first module to the second module may increase or decrease a vulnerability of the second module to a cybersecurity threat.

For example, the first module may include natural language artifacts and the second module may not include any natural language artifacts. The tool may be configured to apply the cybersecurity sentiment of the first module to the second module. Because the second module is functionally linked to the first module any vulnerability of the first module to a cybersecurity threat may also apply to the second module.

The first module may be part of a first source code file. The second module may be part of a second source code file. The first and second modules may be included in one source code file.

The second module may include its own natural language artifacts. Other modules of the second source code file may include natural language artifacts that express a cybersecurity sentiment. In some embodiments, the tool may determine a combined cybersecurity sentiment and perceived cybersecurity sentiment based on a cybersecurity sentiment of the first module and a cybersecurity sentiment of the second module. The combined cybersecurity sentiments may provide an indicator of vulnerability of a program that utilizes functionality of the first and second modules.

The software tool may determine a cybersecurity sentiment for a first module in the source code file. The tool may reduce vulnerability of the first module to a cybersecurity threat. The tool may reduce the vulnerability based on a functional relationship linking the first module to a second module. For example, the second module may be known to be secure against a cybersecurity threat.

In some embodiments, the second module may be associated with a known vulnerability to a cybersecurity threat. A cybersecurity sentiment of the first module may not exceed the threshold negativity level. However, because the first module is functionally linked to the second module, the vulnerability of the second module may be imputed to the first module. When the vulnerability of the second module is associated with the first module, the cybersecurity sentiment of the first module may exceed the threshold negativity level.

The tool may determine a cybersecurity sentiment and a perceived cybersecurity sentiment using a set of rules. The set of rule may be codified in a scripting language. The rules and associated scripting language may, for each natural language artifact in a source code file, determine a cybersecurity topic associated with the artifact. The scripting language may also determine whether the artifact expresses an opinion about a cybersecurity topic. The scripting language may also determine whether the artifact expresses a positive, negative or neutral opinion toward the cybersecurity topic.

The rules may include a dictionary of words. The words may be associated with topic. Illustrative words and phrases that are typically indicative of a cybersecurity topic may include: network, malicious, security, data, identity, internet, password, interact, protect, ransomware, malware, virus, connection and denial of service and identity protection.

The words may be associated with a polarization—positive, negative or neutral. The words may be associated with a cybersecurity topic. Illustrative words and phrases that typically convey a negative polarization may include: bad, worst, cybercrime, breach, malware, threat, hacker, victim, fear, vulnerable, danger, dislike, awful, phish, ransomware, malicious, denial of service, attack, unpatched, outdated and hijack.

Illustrative words and phrases that typically convey a neutral polarization may include: security, cybersecurity, privacy, data identity, protection, passwords, surveillance, unconcerned and compliance. Illustrative words and phrases that typically convey a positive polarization may include: secure, good, best, protect, safe, great, glad, awesome, smart, happy, high security and intelligent.

The dictionary may be tuned for use on specific source code files. For example, the dictionary may be tuned based on a nomenclature used by a specific a programming language. The dictionary may be tuned based on analysis of other code written by a developer-author of a source code file. The dictionary may be tuned based on organizational coding guidelines, an overall function of the source code or any other suitable factors.

The tool may count the number of polarized artifacts that appear in a source code file. The tool may count the number of negative artifacts that appear in the source code file. Based on a total number of negative artifacts, compared to the total number of polarized artifacts, the scripting language may determine whether the source code expresses a threshold negativity level.

The scripting language may account of polarization due to punctuation or formatting. For example, the rules may increase intensity of an artifact due to an exclamation point. The rules may adjust intensity of an artifact when the artifact is written in "all caps" in the presence of other non-all uppercase artifacts. The rules may increase intensity of an artifact based on detecting a presence of degree modifiers (e.g., extremely, very, not, almost) in close proximity to an examined artifact.

The scripting language may adjust intensity based on presence of a contrastive conjunction such as: but, and, yet, or, because, nor, although, since, unless, while and where. The scripting language may adjust intensity based on presence emoticons.

Illustrative positive emoticons may include :-), (-:, =), (=, (:, :), :D, :d, d:, : ), (:, 8), (8, 8 ), ;), ; ), ; ), (:, ;-), (-:, (:, and ^-^. Illustrative negative emoticons may include :-(, :-(,)-:, =(, )=, :(, ):, 8(, and )8.

Cybersecurity sentiments determined by the tool may provide predictive indicators of vulnerability of a source code file to a cybersecurity threat. For example, a source code file that includes artifacts determined to have extreme negative sentiments toward a cybersecurity topic may indicate that the course code file is vulnerable to a cybersecurity threat.

The tool may determine the cybersecurity sentiment and the perceived cybersecurity sentiment using a machine learning model. The machine learning model may include a classifier model. The classifier model may be trained using training data. The training data may include formulating a specific dictionary for detecting target cybersecurity threats, specific programming languages, specific developer or specific line-of-business.

The tool may utilize a machine learning model trained using associations linking software functionality and a natural language text string. The tool may utilize a machine learning model trained using associations linking the software functionality and the natural language text string to a cybersecurity threat. Based on a polarity of the natural language text string, the machine learning model may determine a cybersecurity sentiment expressed by artifacts in the source code file.

Illustrative classifier models may include naive Bayes predictors, linear regression, maximum entropy and support vector machines, deep learning or neural networks. The machine learning model may utilize two or more classifier models in tandem, parallel, or in a loop. The classifier model may utilize both supervised and unsupervised learning methods to determine cybersecurity sentiments.

The machine learning model may be configured to vectorize natural language artifacts embedded in a source code. Artifact vectorization may include associating each artifact with a cybersecurity topic. Artifact vectorization may include determining a segment of the artifact that expresses an attitude toward a cybersecurity topic (e.g. positive, negative, or neutral). Artifact vectorization may include generating a bag-of-words representation of the artifacts included in a source code file. In a bag-of-words representation, artifacts may be represented as a set of words, disregarding grammar and even word order but maintaining word frequency.

The machine learning model may apply a neural network to the vectorized artifacts. The neural network may determine a cybersecurity sentiment for each artifact in a source code file. The neural network may determine an overall cybersecurity sentiment for the source code file.

Apparatus for a software tool is provided. The tool may be configured to ingest a source code file. The tool may determine whether the source code file is vulnerable to a cybersecurity threat. The tool may quarantine source code files that are vulnerable to a cybersecurity threat. The tool may include computer executable instructions. The computer executable instructions, when executed by a processor on a computer system may implement functionality of the tool.

The tool may be configured to iterate through each line of a source code file. The tool may identify and extract natural language artifacts from the source code file. The tool may apply a lexicon-based dictionary to the extracted natural language artifacts. Utilizing the lexicon-based dictionary, the tool may determine a first cybersecurity sentiment for the source code file. The tool may apply a machine learning model to the extracted natural language artifacts. The tool may utilize the machine learning model to determine a second cybersecurity sentiment for the source code file.

The tool may quarantine the source code file when the first and second cybersecurity sentiments are collectively above a threshold negativity level. The first and second cybersecurity sentiments may identify an opinion regarding vulnerability of the source code file to a cybersecurity threat.

The tool may utilize a lexicon-based dictionary. The lexicon-based dictionary may be created using words extracted from a plurality of source code files. Each word in the dictionary may be associated with a cybersecurity topic and polarity regarding the cybersecurity topic. The machine learning model utilized by the tool may be trained using the lexicon-based dictionary.

The tool may determine a perceived cybersecurity sentiment. The perceived cybersecurity sentiment may be determined based on data provided by end users of the source code file. The tool may be configured to adjust the threshold negativity level associated with a source code file based on the perceived cybersecurity sentiment.

For example, when the perceived cybersecurity sentiment is positive, the tool may raise the threshold negativity level needed to trigger a quarantining of the source code. Thus, despite negative cybersecurity sentiments determined based on natural language artifacts in the source code, the tool may not quarantine the code due a counterbalancing by positive perceived cybersecurity sentiments. The tool may quarantine the code due to negative perceived cybersecurity sentiments despite positive cybersecurity sentiments determined based on natural language artifacts.

For each natural language artifact included in a source code file, the tool may determine whether the artifact includes information that identifies a specific individual. In response to determining that the artifact does identify the specific individual, the tool may not extract or determine a sentiment for the artifact.

The tool may be configured to identify natural language artifacts included in a source code file. For example, an artifact may be an embedded comment. A particular programming language may use specific syntax to identify embedded comments. An artifact may include text of an error message. The tool may look for function calls associated with displaying error messages. An artifact may include a text string used as a variable identifier. The tool may search for variable definition within the source code file. An artifact may include a file name. The tool may search for file extensions within the source code file.

It should be appreciated that performing sentiment analysis is technically challenging in general, and poses an even greater technical challenge with respect to source code files. Sentiment analysis cannot be performed by humans. The volume of data is too overwhelming to be processed manually. Furthermore, humans do not follow clearly defined criteria for evaluating expressed sentiments.

Manually performed sentiment analysis is highly subjective heavily influenced by personal experiences, thoughts, and beliefs. When judging expressed sentiment, people only agree in about 60-65% of the time. See, http://ceur-ws.org/Vol-1096/paper1.pdf. Thus, manually performed sentiment analysis provides inconsistent and divergent results. Such inconsistent and divergent results are unsuitable for reliably identifying vulnerabilities to cybersecurity threats in computer source code files.

Apparatus and methods in accordance with this disclosure will now be described in connection with the figures, which form a part hereof. The figures show illustrative features of apparatus and method steps in accordance with the principles of this disclosure. It is to be understood that other embodiments may be utilized, and that structural, functional and procedural modifications may be made without departing from the scope and spirit of the present disclosure.

The steps of methods may be performed in an order other than the order shown and/or described herein. Method embodiments may omit steps shown and/or described in connection with illustrative methods. Method embodiments may include steps that are neither shown nor described in connection with illustrative methods. Illustrative method steps may be combined. For example, an illustrative method may include steps shown in connection with any other illustrative method.

Apparatus may omit features shown and/or described in connection with illustrative apparatus. Apparatus embodiments may include features that are neither shown nor described in connection with illustrative apparatus. Features of illustrative apparatus may be combined. For example, an illustrative apparatus embodiment may include features shown or described in connection with another illustrative apparatus/method embodiment.

FIG. 1 shows illustrative system 100. System 100 includes source code file repository 103. Repository 103 may include multiple source code files associated with a software application. Each source code file include in repository 103 may be written in a different programming language. Two or more source code files may be written in the same programming language. Each source code file include in repository 103 may be written by different developers. Two or more source code files may be written by the same developer.

Source code files included in repository 103 may include natural language artifacts 101. Artifacts 101 may include expression, idioms, phrases or words that express opinions, feelings and subjectivity of a developer. Sentiment determination engine 107 may computationally determine the sentiments—opinions, feelings and subjectivity—expressed by artifacts 101.

Sentiment determination engine 107 may computationally determine sentiments expressed by artifacts 101 based on analysis across a module of a source code file, an entire source code file, or all source code files included repository 103. Engine 107 may classify the sentiment expressed by artifacts 101 as positive, negative or neutral.

Engine 107 may utilize a machine learning model to determine sentiments expressed by artifacts 101. Engine 107 may utilize a lexicon-based dictionary to determine sentiments expressed by artifacts 101. Engine 107 may employ a hybrid approach that utilizes a lexicon-based dictionary and a machine learning model to determine sentiments expressed by artifacts 101. Engine 107 may utilize signals, expressed by words, formatting (e.g., bold or underline), emoticons or punctuation to correlate vulnerability of source code to cyber security threats 105.

FIG. 2 shows illustrative source code 200. Engine 107 (shown in FIG. 1) may mine source code 200 for natural language artifacts 101. FIG. 2 shows that engine 107 has identified artifacts 201-225 in source code 200.

FIG. 3 shows how engine 107 has classified sentiments expressed by artifacts 201-225 (shown in FIG. 2).

FIG. 3 shows that artifact 201 is a function name that may relate to the cybersecurity topic of unpatched or outdated software vulnerabilities. Engine 107 may have determined the cybersecurity topic based on a sentiment expressed by artifact 201. Artifact 201 expresses that it is not a function called frequently and that it may only be called as a contingency measure (e.g., "just in case . . . "). A sentiment polarity of artifact 201 is high because of the expressive nature of artifact 201.

FIG. 3 shows that artifact 203 is a function name that may relate to the cybersecurity topic of a distributed denial-of-service ("DDoS") attack. A DDoS attack may include a malicious attempt to disrupt normal traffic of a targeted computer server, service or network by overwhelming a computer system or its surrounding infrastructure with a flood of undesired communication traffic.

Engine 107 may determine a cybersecurity topic associated with artifact 203. Artifact 203 includes words related to data connectivity (e.g., "connection options"). Engine 107 may determine the cybersecurity topic by detecting capitalization of letters in artifact 203. The capitalization may provide logical breaks in what would otherwise be a uniform string of text.

Engine 107 may also determine a cybersecurity topic for artifact 203 based on its proximity to artifact 205 (e.g., "internet"). Engine 107 has determined that a sentiment polarity of artifact 203 is neutral because artifact 203 does not express a particular view point.

Engine 107 may determine a cybersecurity topic associated with artifact 205. Artifact 205 includes words that imply it relates to connectivity (e.g., "internet"). Engine 107 may also determine the cybersecurity topic for artifact 205 based on its proximity to artifact 203 (e.g., "ConnectionOptions"). Engine 107 has determined that a sentiment polarity of artifact 205 is neutral because artifact 205 does not express a particular view point.

Engine 107 may determine a cybersecurity topic associated with artifact 207. Artifact 207 includes words that imply it relates to malicious code. Artifact 207 includes an instruction directing a user to establish network connection. Engine 107 may also determine the cybersecurity topic for artifact 205 based on its proximity and logical position relative to artifacts 203 and 205. Engine 107 has determined that a sentiment polarity of artifact 207 is neutral because artifact 207 does not express a particular view point regarding a cybersecurity topic.

Engine 107 may determine a cybersecurity topic associated with artifact 209. Artifact 209 is a comment that describes that it is enabling direct communication with a user device. Such direct communication may be utilized to deceive a user into disclosing personal information. Engine 107 has determined that a sentiment polarity of artifact 205 is high because artifact 209 includes the degree modifier "important."

Engine 107 may determine that artifact 211 is associated with the cybersecurity topic of malicious code. Artifact 211 is a comment that describes that it is enabling direct communication with a user device. Artifact 211 includes words that imply it will trigger execution of a service or process (potentially unauthorized) on a user device (e.g., "user device service"). Engine 107 has determined that a sentiment polarity of artifact 211 is neutral because artifact 211 does not express a particular view point regarding the cybersecurity topic.

Engine 107 may determine a cybersecurity topic associated with artifacts 213 and 215. Each of artifacts 213 and 215 include words (e.g., "ID") that imply they each relate obtaining information that may lead to account hijacking. Account hijacking includes mal-processes that compromise a user's email account, computer account or any other account associated with a computing device or service. Engine 107 has determined that a sentiment polarity of artifacts 213 and 215 are neutral because they do not express a particular view point regarding a cybersecurity topic.

Engine 107 may determine that artifact 217 is associated with the cybersecurity topic of phishing. Artifact 217 is a message text that describes a software application has not been able to establish communication with a user device. Artifact 217 includes words that imply it is attempting to communicate with a user device (e.g., "SMS," "message," "internet" and "connection"). Engine 107 has determined that a sentiment polarity of artifact 217 is high because artifact 217 includes the "no," a contrastive conjunction.

Engine 107 may determine that artifact 219 is associated with the cybersecurity topic of data breach. A data breach is a cyber security threat in which information is accessed without authorization. Artifact 219 is a file name that describes confidential financial information (e.g., "finance" and "transactions"). Engine 107 has determined that a sentiment polarity of artifact 219 is neutral because artifact 219 does not express a particular view point regarding a cybersecurity topic.

Engine 107 may determine that artifact 221 is associated with the cybersecurity topic of a DDoS attack. Artifact 221 is a comment instructing a user to activate a data connection. Engine 107 has determined that a sentiment polarity of artifact 221 is high because artifact 221 include artifact 223.

Artifact 223 is an expressive "winking" emoticon. In this context, engine 107 may determine that artifact 223 adds sarcasm to the message conveyed by artifact 221.

Engine 107 may determine that artifact 225 is associated with the cybersecurity topic of a DDoS attack. Artifact 225 is a message text displayed to a user. Engine 107 has determined that a sentiment polarity of artifact 2225 is high because the subjective tone of artifact 225. Engine 107 may detect a potentially condescending tone associated with artifact 225.

Figure 4:
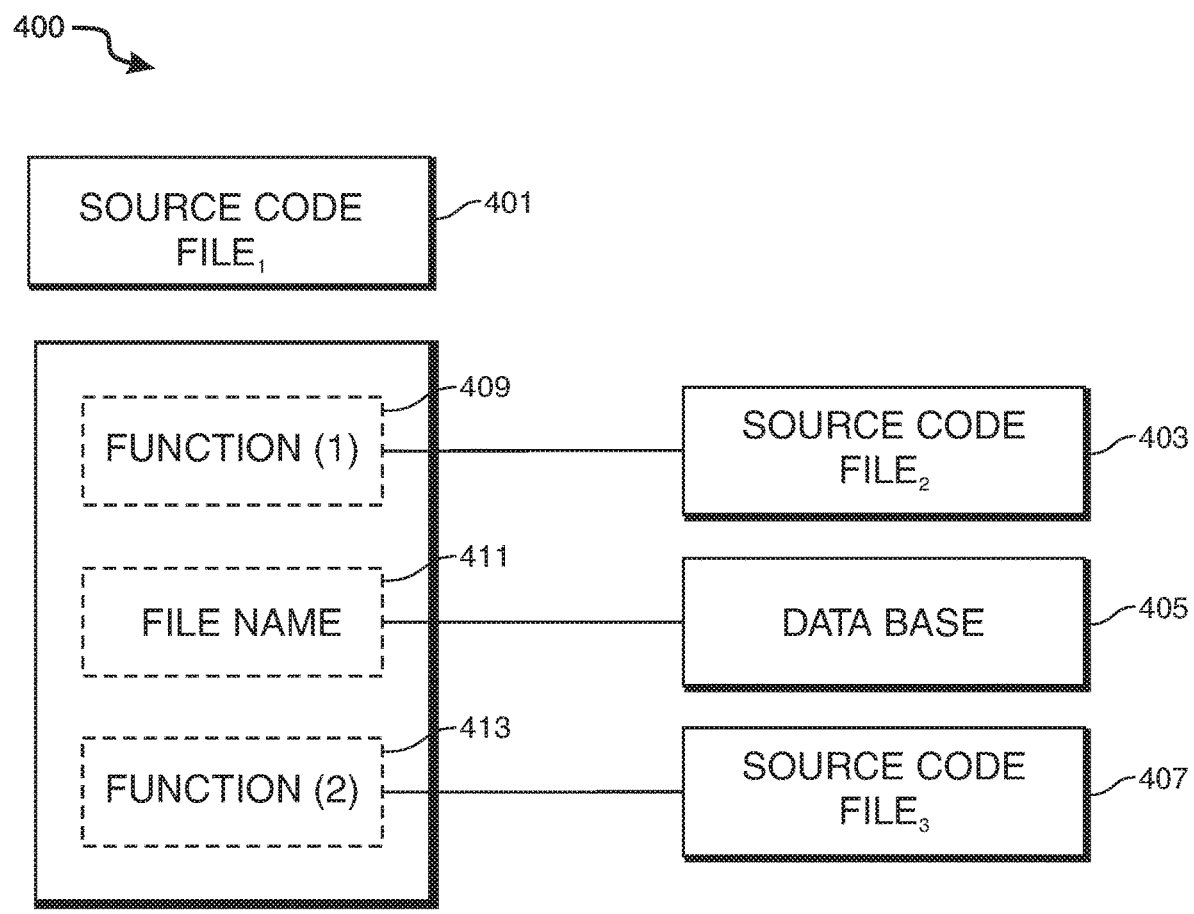
FIG. 4 shows illustrative links between source code modules in accordance with principles of the disclosure.

FIG. 4 shows illustrative links 400 between modules in source code file 401 and modules 403, 405 and 407. FIG. 4 shows that function 409 is linked to source code file 403. For example, function 409 may be invoked by source code file 403. A cybersecurity sentiment of function 409 may be imputed to source code file 403. A cybersecurity sentiment of source code file 403 may be imputed to function 403.

FIG. 4 shows that file name 411 is linked to database 405. For example, file name 411 may be stored on database 405. A cybersecurity sentiment of file name 411 may be imputed to database 403. A cybersecurity sentiment of file name 411 may be imputed to database 403.

FIG. 4 shows that function 413 is linked to source code file 407. For example, function 413 may require execution of code in source code file 403. A cybersecurity sentiment of function 409 may be imputed to source code file 403. A cybersecurity sentiment of source code file 403 may be imputed to function 403. All of the cybersecurity sentiments associated with a source code file may be taken into account when determining a vulnerability of the source code file to a cyber threat.

Figure 5:
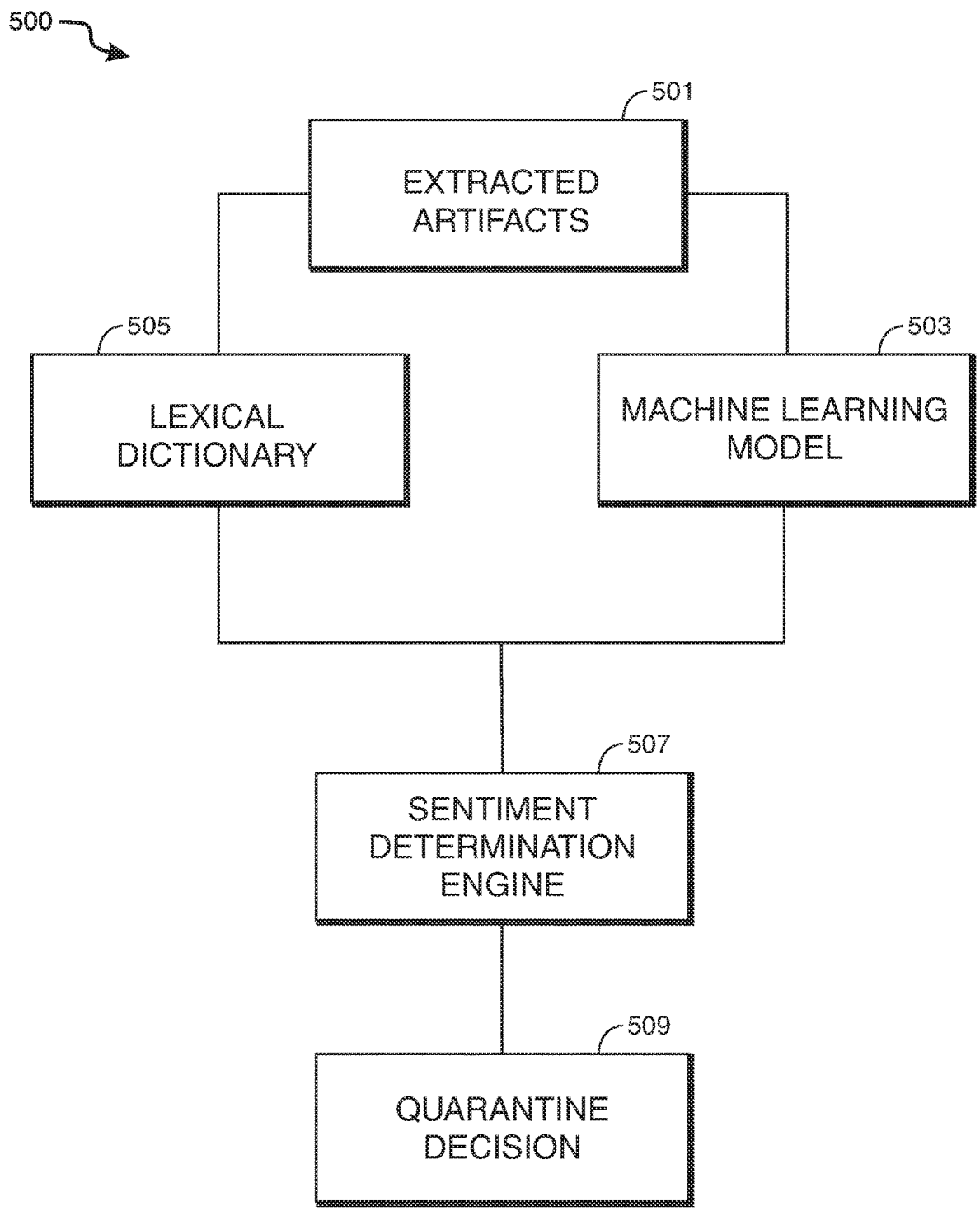
FIG. 5 shows an illustrative process in accordance with principles of the disclosure.

FIG. 5 shows illustrative process 500. Process 500 begins at 501. At step 501, the system has already extracted natural language artifacts from a source code file.

At step 503, the system applies, in parallel, machine learning model 503 to the extracted artifacts. The system may use the machine learning model to determine a cybersecurity sentiment expressed by the extracted artifacts. Using the machine learning model, the system may attempt to understand subject, meaning and intent of the extracted artifacts.

At step 505, the system applies a lexicon-based dictionary to the artifacts. The system may use the lexicon-based dictionary to determine a cybersecurity sentiment expressed by the extracted artifacts. Using the lexicon-based dictionary, the system may attempt to understand subject, meaning and intent of the extracted artifacts.

The subject, meaning and intent determined by the lexicon-based dictionary at step 505 may be different from the subject, meaning and intent determined by the machine learning model at step 503. The subject, meaning and intent determined by the lexicon-based dictionary at step 505 may overlap with the subject, meaning and intent determined by the machine learning model at step 503.

At step 507, the system determines a cybersecurity sentiment associated with a source code file. At step 507, the system may take account of differences and/or overlaps in the subject, meaning and intent determined at steps 503 and 505. Based on the cybersecurity sentiment, at step 509, the system may determine whether to quarantine the source code file.

The source code file may be quarantined when a cybersecurity sentiment of the source code file indicates that the source code file is vulnerable to a cybersecurity threat. A threshold vulnerability may be reached when a source code file is associated with a cybersecurity sentiment that exceeds a threshold negativity level. Quarantining the source code file may include disabling functionality of a software application that utilizes the source code file.

Figure 6:
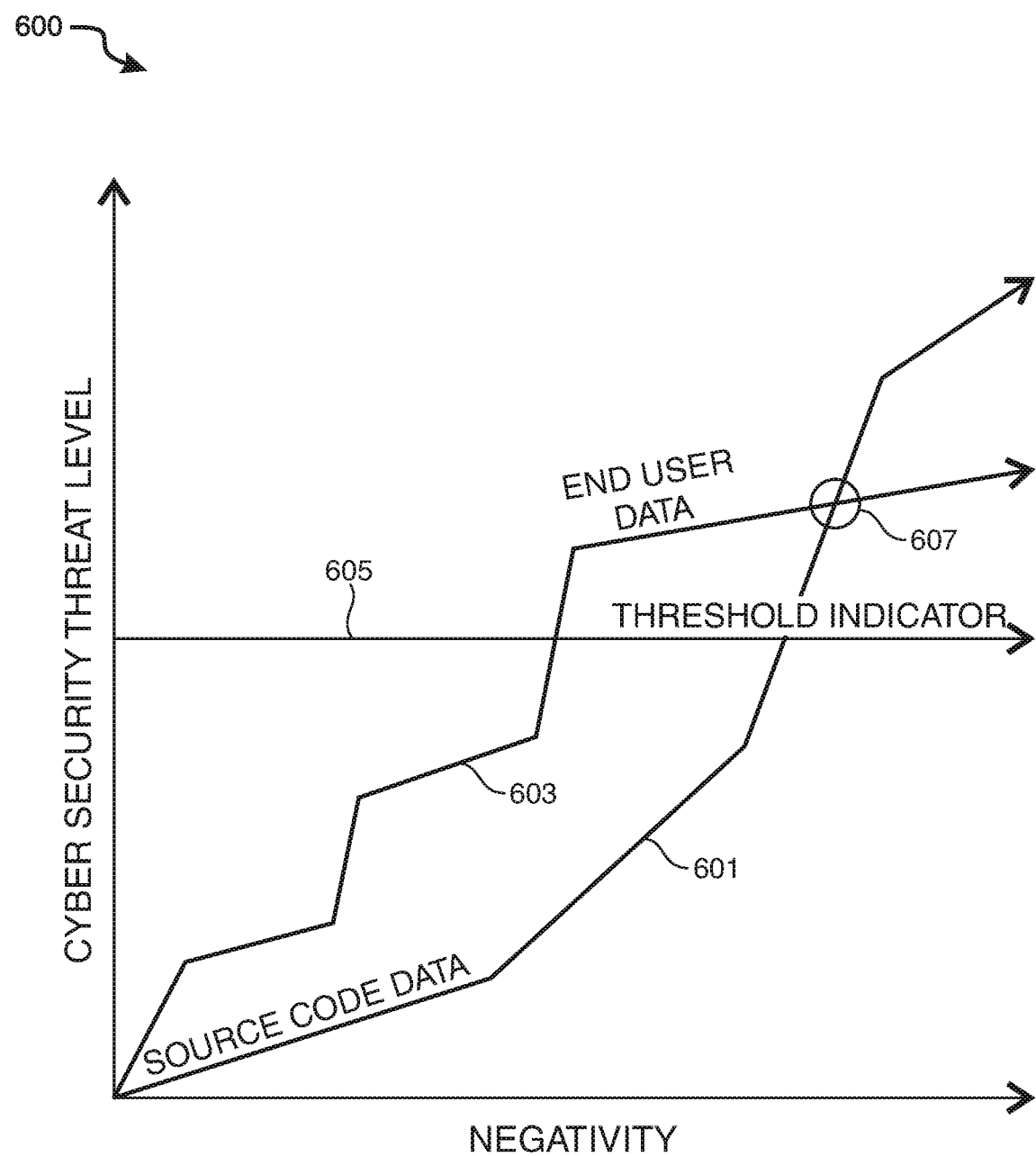
FIG. 6 shows illustrative information in accordance with principles of the disclosure.

FIG. 6 shows visual depiction 600 of information that may be used to determine when to quarantine a source code file. FIG. 6 shows that a source code file may be associated with cybersecurity sentiment 601. Cybersecurity sentiment 601 is determined based on natural language artifacts included in the source code file.

FIG. 6 shows that a source code file may be associated with perceived cybersecurity sentiment 603. Perceived cybersecurity sentiment 603 is determined based on how end users view vulnerability of functionality provided by the source code file to cybersecurity threat.

FIG. 6 shows that cybersecurity sentiment 601 and perceived cybersecurity 603 both include the same level of negativity at point 607. Negativity may refer to sentiment that is understood to reflect that the source code file may not withstand a cybersecurity threat. FIG. 6 also shows that at point 607, cybersecurity sentiment 601 and perceived cybersecurity 603 both exceed threshold indicator 605. Threshold indicator 605 may correspond to a point when the source code file is vulnerable to being compromised by a cybersecurity threat.

Figure 7:
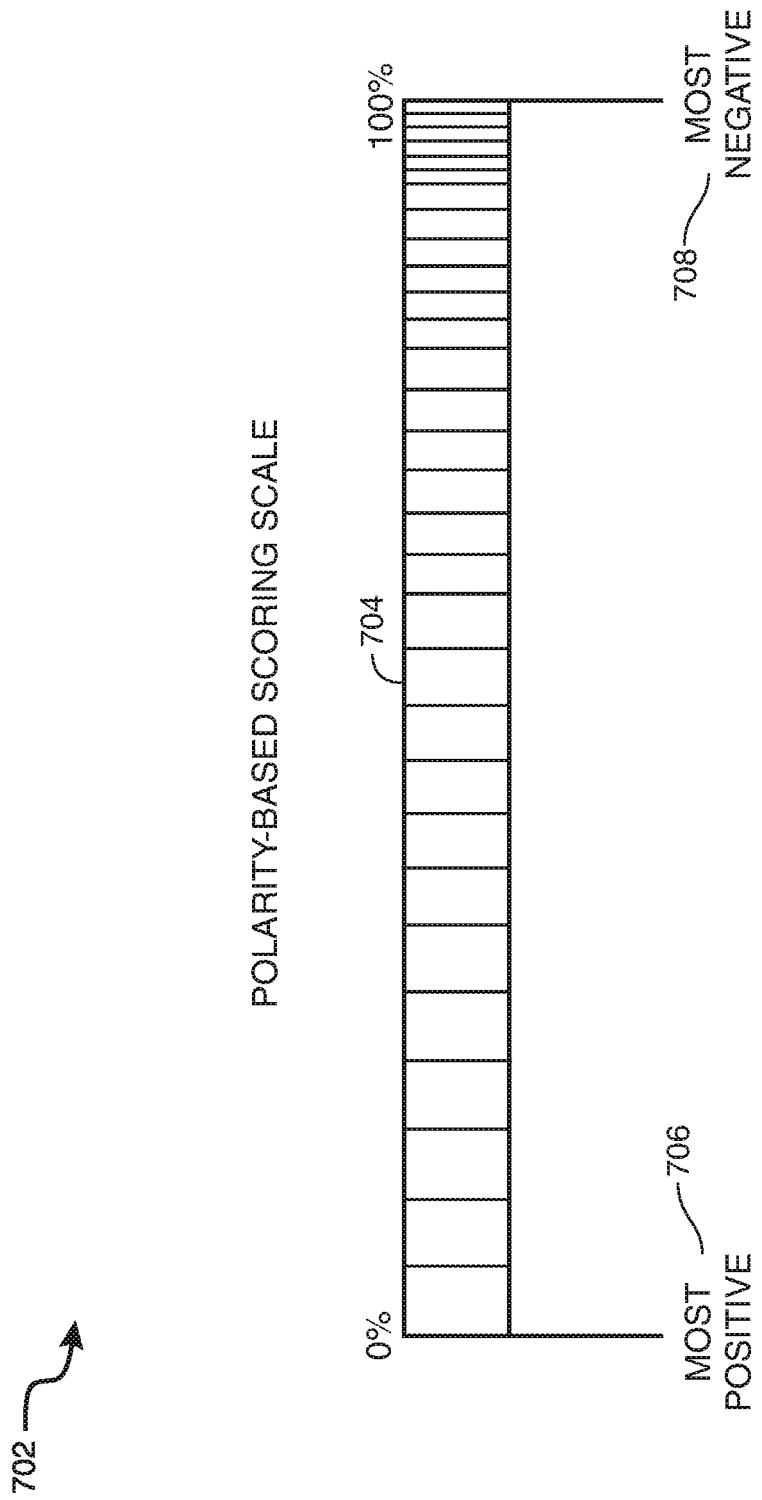
FIG. 7 shows illustrative information in accordance with principles of the disclosure.

FIG. 7 shows illustrative sentiment scoring scale 702. There may be various different methods or scales for scoring or rating sentiment of artifacts. For example, an artifact may be scored based on positive or negative sentiment. An artifact may be scored based on polar emotions, such as happy or sad. An artifact may be scored in a non-polar scale, such as a vector scaling model. An artifact may be scored based on a collection of multiple sentiment scoring methods or models.

Polarity-based scoring scale 704 is shown in FIG. 7. In such a scoring scale, each artifact is scored on a polar scale using linguistic scoring methodology. Linguistic scoring methodology may utilize various language scoring methods, such as natural language processing, computational linguistics and biometrics. The language scoring methodology may also include text analysis. The text analysis may analyze various components of the text. It should be appreciated that, to a human reader, certain text components, such as sarcasm, exaggerations or jokes may be easily understood. However, a computer may require special methods to ensure that such linguistic terms are not misinterpreted. Therefore, text-based sentiment analysis may analyze key words and phrases, emoticons, characters, length of response, response time between artifacts, related artifacts, negation, exaggeration, jokes and sarcasm. Based on the linguistic scoring methodology, each artifact may be scored on a scale of 0% to 100%, as shown at 706 and 708. 0% may indicate most positive and 100% may indicate most negative.

It should be appreciated that a polarity-based scale may include two opposite emotions, whether positive and negative, happy and sad or any other suitable opposite emotions. Therefore, each artifact scored on a polarity-based score may be given a score based on the polarity of the artifact. However, at times, in order to compensate for the shortcomings of the polarity-based scoring models, an artifact may be scored on multiple polarity-based scoring models, and, the results of the scoring models may be combined.

Figure 8:
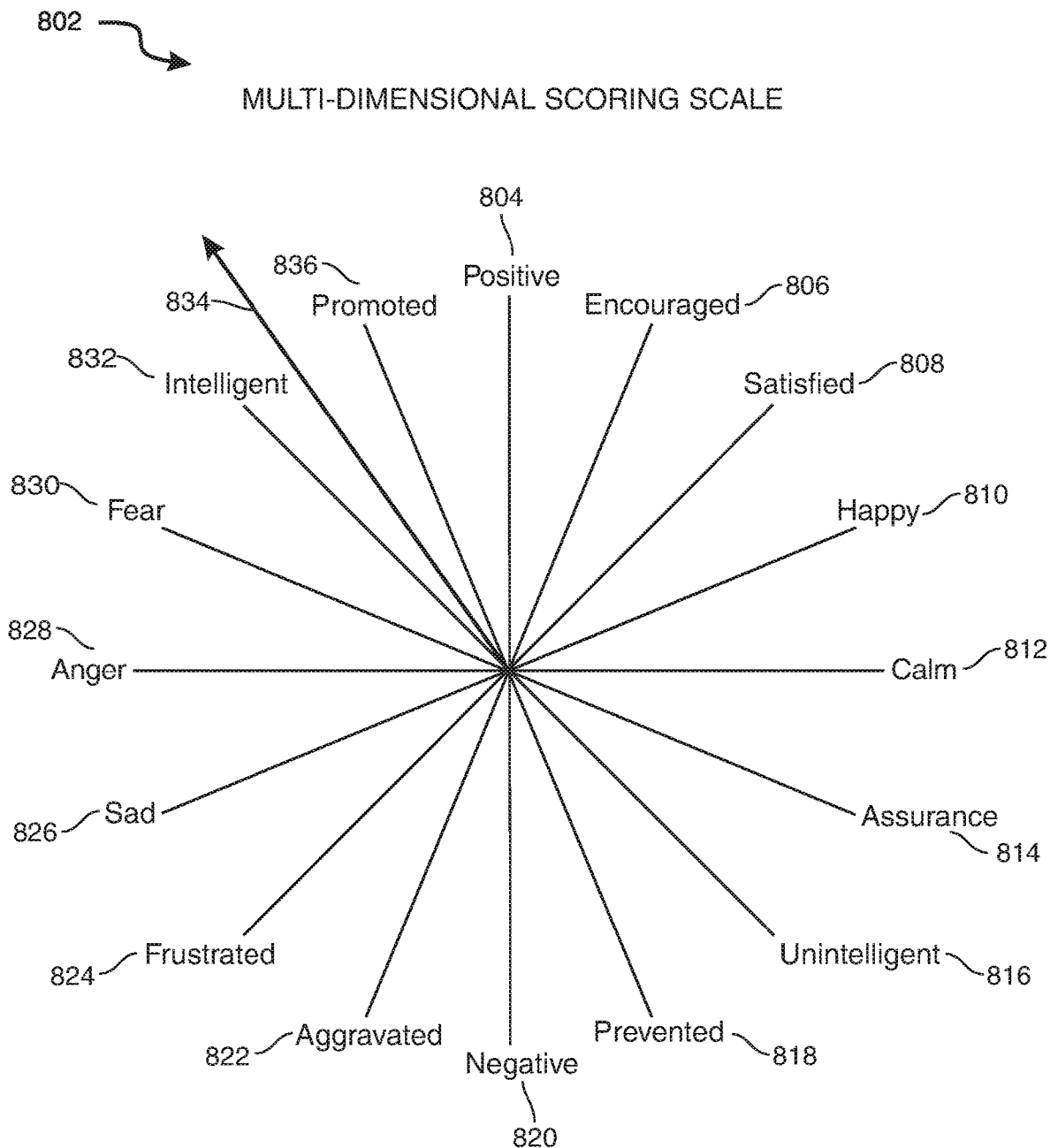
FIG. 8 shows illustrative information in accordance with principles of the disclosure.

FIG. 8 shows illustrative multi-dimensional sentiment scoring scale 802. Multi-dimensional scoring scale 802 may include a plurality of vectors. Each of the vectors may correspond to a different emotion or sentiment. The emotions, or sentiments shown, may include positive (804), encouraged (806), satisfied (808), happy (810) calm (812), assurance (814), unintelligent (816), prevented (818), negative (820), aggravated (822), frustrated (824), sad (826), anger (828), fear (830), intelligent (832) and promoted (836).

Vector 834 may be a vector generated from an artifact. The artifact may include a plurality of attributes. The artifact may be broken down into component parts. The attributes and the component parts may be used to plot the artifact on the multi-dimensional scoring scale.

The sentiment of the artifact plotted as vector 834 may be shown in-between intelligent and promoted. It should be appreciated that the multi-dimensional scoring scale may be used to determine the sentiment of an artifact. The multi-dimensional scoring scale may include a plurality of other emotions, not shown. In some embodiments, the multi-dimensional scoring scale may utilize any suitable emotion chart.

Figure 9:
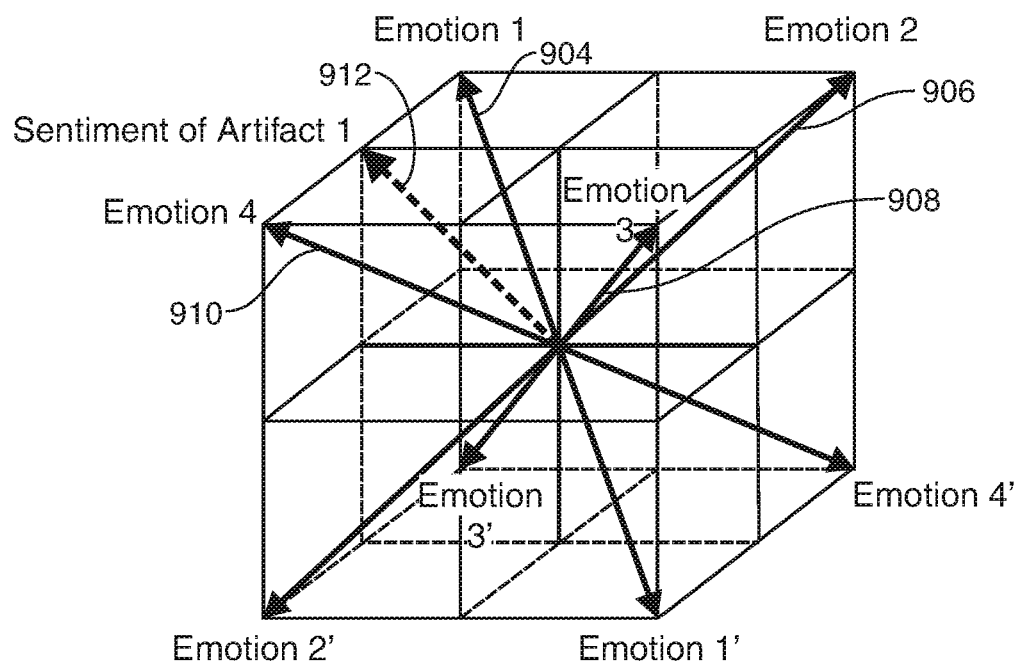
FIG. 9 shows illustrative information in accordance with principles of the disclosure.

FIG. 9 shows multi-dimensional sentiment scoring scale 902. Multi-dimensional scoring scale 902 may be another scoring scale. Multi-dimensional scoring scale 902 may be a three-dimensional scoring scale. The three dimensions of multi-dimensional scoring scale 902 may include an x-dimension (horizontal), a y-dimension (vertical) and a z-dimension (depth). Vectors that represent emotions may be plotted on scoring scale 902.

A vector may have multiple dimensions, such as an x-dimension, a y-dimension and a z-dimension. As such, a vector plotted on scoring scale 902 may include an x-dimension, y-dimension and z-dimension. Multiple emotions may be plotted on scoring scale 902. Each plotted emotion may be represented by a vector, such as vector 804 that represents emotion 1, vector 906 that represents emotion 2, vector 908 that represents emotion 3 and vector 910 that represents emotion 4.

Build of a vector, or orientation of a vector, could be based on one or more of a combination of sentiments or emotions. In some embodiments, vector length could correspond to magnitude or intensity of a vector.

Each plotted vector that represents an emotion may have two extremes. For example, a vector may represent a range of happiness and sadness. Each point of the vector may represent a different extreme in the range of happiness and sadness. At the (0,0,0) point, the vector may represent neutrality (neither happy nor sad). Location points found on the vector above the (0,0,0) point may represent a gradually increasing degree of happiness, while location points found below the (0,0,0) point may represent a gradually increasing degree of sadness.

Upon the receipt of an unlabeled artifact, the artifact may be broken down into component parts. The component parts may be used to generate an artifact vector. The artifact vector may be plotted on a multi-dimensional scoring scale, such as scoring scale 902. Such an artifact vector may be shown at 912. Artifact vector 910 may represent the sentiment of artifact 1. Because the sentiment of an artifact may be multi-faceted—i.e., may include multiple emotions, vector 912 may represent the sentiment of artifact 1 with respect to the emotion vectors—i.e., vectors 904, 906, 908 and 910.

In some embodiments, the emotion vector, or vectors, that most closely represents the sentiment of the artifact may be displayed to a user. In certain embodiments, a detailed score comprising the various components of the artifact may be shown. For example, an artifact may be determined to include 20% happiness, 40% kindness, 30% caring and 10% consideration. For such an artifact, the entire breakdown may be shown and/or the single most dominant attribute—i.e., kindness—may be shown. In some embodiments, the only displayed sentiment may be positive or negative.

Thus, apparatus and methods for a SENTIMENT ANALYSIS FOR SECURING COMPUTER CODE are provided. Persons skilled in the art will appreciate that the present disclosure can be practiced by other than the described embodiments, which are presented for purposes of illustration rather than of limitation. The present disclosure is limited only by the claims that follow.

What is claimed is:

1. A method for automating detection of source code vulnerable to a cybersecurity threat, the method comprising:
   importing a source code file;
   determining a programming language of the source code file;
   iterating through each line of the source code file and extracting natural language artifacts embedded in the source code file, said extracted natural language artifacts comprising a code comment wherein the code comment is identified based on detecting a target syntax in the source code;
   for each extracted natural language artifact:
      determining whether the source code file includes code that is vulnerable to the cybersecurity threat based on:
         a contextual relationship of the extracted natural language artifact to a function in the source code file that is associated with operation of a cyberattack;
         using natural language processing to determine a subject and a polarity of the extracted natural language artifact; and
         based on the subject and the polarity, determine a cybersecurity sentiment of the extracted natural language artifact, wherein the cybersecurity sentiment indicates whether the extracted natural language artifact expresses vulnerability of the function to the cybersecurity threat; and
   when the source code file includes a threshold quantity of vulnerable code, quarantining the source code file.

2. The method of claim 1, wherein quarantining the source code file comprises preventing execution of a computer program that includes the source code file.

3. The method of claim 1, further comprising:
   determining an overall polarity of all the extracted natural language artifacts; and
   based on the overall polarity, quarantining the source code file when source code file includes less than the threshold quantity of vulnerable code.

4. The method of claim 1, wherein the extracted natural language artifacts also comprise one or more of:
   an error message;
   a variable identifier; and
   a file name referenced in the source code file.

5. The method of claim 1 further comprising determining the programming language based on syntax of the source code file.

6. The method of claim 1 further comprising:
   determining the cybersecurity sentiment by end users of a service provided by a product that includes the source code; and
   when the cybersecurity sentiment and the threshold number of instances of vulnerable source code collectively exceed a threshold negativity level, quarantining the source code file.

7. The method of claim 1 further comprising determining the contextual relationship based on one or more of:
   a proximity of the extracted natural language artifact to the function;
   a textual pattern shared by the extracted natural language artifact and the function; and
   a functional relationship between the extracted natural language artifact and the function.

8. The method of claim 1 further comprising:
   forecasting a likelihood the source code file will be compromised by a potential cybersecurity threat based on an overall:
      contextual relationship of the extracted natural language artifacts to the potential cybersecurity threat; and
      polarity of the extracted natural language artifacts; and
   when the likelihood is above a threshold level, quarantining the source code file.

9. An automated detection software tool for quarantining source code vulnerable to a cybersecurity threat, the software tool comprising:
   a processor;
   a non-transitory memory; and
   computer executable instructions stored in the non-transitory memory, that when executed by the processor on a computer system:
      iterate through each line of a source code file and extracts natural language artifacts from the source code file, said extracted natural language artifacts comprising a code comment contextually related to a function of the source code file associated with operation of a cyberattack, wherein the code comment is identified based on detecting a target syntax in the source code;
      for the extracted natural language artifacts, determine:
         a subject and a polarity of the extracted natural language artifacts;
         based on the subject and the polarity, a cybersecurity sentiment for the source code file, wherein the cybersecurity sentiment indicates whether the extracted natural language artifacts express vulnerability of the function to the cybersecurity threat; and
         a perceived cybersecurity sentiment of an end user of the source code file; and
      quarantine the source code file when a combined cybersecurity sentiment and perceived cybersecurity sentiment is above a threshold negativity level with respect to vulnerability of the source code file to the cybersecurity threat.

10. The software tool of claim 9 further comprising computer executable instructions, that when executed by the processor on the computer system:
    determine the cybersecurity sentiment for a first module of the source code file; and
    based on a functional relationship linking the first module in the source code file to a second module in the source code file, apply the cybersecurity sentiment of the first module to the second module;
    wherein:
       the second module does not include any natural language artifacts; and
       the combined cybersecurity sentiment and perceived cybersecurity sentiment comprises the cybersecurity sentiment of the first module and the cybersecurity sentiment of the second module.

11. The software tool of claim 9 further comprising computer executable instructions, that when executed by the processor on the computer system:
    determine the cybersecurity sentiment for a first module in the source code file; and increase the threshold negativity level of the first module to the cybersecurity threat based on a functional relationship linking the first module to a second module in the source code file;
wherein the second module is associated with a known vulnerability to the cybersecurity threat.

12. The software tool of claim 9 further comprising computer executable instructions, that when executed by the processor on the computer system determines the perceived cybersecurity sentiment using a set of rules, codified in a scripting language that, for each extracted natural language artifact, determine:
    a cybersecurity topic associated with the extracted natural language artifact; and
    whether the extracted natural language artifact expresses a positive or negative attitude toward the cybersecurity topic.

13. The software tool of claim 9 further comprising computer executable instructions, that when executed by the processor on the computer system determine the cybersecurity sentiment and the perceived cybersecurity sentiment using a machine learning model that is configured to:
    vectorize the extracted natural language artifacts embedded in the source code file by associating each extracted natural language artifact with a cybersecurity topic and a segment of the extracted natural language artifact indicating an attitude to the cybersecurity topic; and
    apply a neural network to the vectorized extracted natural language artifacts to determine the cybersecurity sentiment for the source code file.

14. The software tool of claim 13, wherein the machine learning model was trained using associations linking:
    a software functionality and a natural language text string; and
    the software functionality and the natural language text string to the cybersecurity threat.

15. A software tool for quarantining source code vulnerable to a cybersecurity threat, the software tool comprising:
    a processor;
    a non-transitory memory; and
    computer executable instructions stored in the non-transitory memory, that when executed by the processor on a computer system:
        iterate through each line of a source code file and extract natural language artifacts from the source code file, said extracted natural language artifacts comprising a code comment contextually related to a function of the source code file associated with operation of a cyberattack, wherein the code comment is identified based on detecting a target syntax in the source code;
        apply a lexicon-based dictionary to the extracted natural language artifacts and determine:
            a subject and a polarity of the extracted natural language artifacts;
            based on the subject and the polarity, a first cybersecurity sentiment for the source code file, wherein the first cybersecurity sentiment indicates whether the extracted natural language artifacts express vulnerability of the function to the cybersecurity threat;
        applies a machine learning model to the extracted natural language artifacts and determines a second cybersecurity sentiment for the source code file, wherein the machine learning model uses natural language processing to determine the second cybersecurity sentiment; and
        quarantines the source code file when the first and second cybersecurity sentiments are collectively above a threshold negativity level with respect to vulnerability of the source code file to the cybersecurity threat.

16. The software tool of claim 15, wherein the lexicon-based dictionary is created based on a list of words that are:
    extracted from a plurality of source code files; and
    coded to identify a cybersecurity topic and polarity expressed regarding the cybersecurity topic.

17. The software tool of claim 16, wherein the machine learning model is trained using the lexicon-based dictionary.

18. The software tool of claim 15, further comprising computer executable instructions, that when executed by the processor on the computer system:
    determine a perceived cybersecurity sentiment of an end user of the source code file; and
    adjust the threshold level of negativity based on the perceived cybersecurity sentiment.

19. The software tool of claim 15, further comprising computer executable instructions, that when executed by the processor on the computer system, for each extracted natural language artifact detected in the source code file:
    determine whether the extracted natural language artifact includes information that identifies a specific individual; and
    in response to determining that the extracted natural language artifact identifies the specific individual, do not extract the natural language artifact.

20. The software tool of claim 15, wherein the extracted natural language artifacts also comprise one or more of:
    text of an error message;
    a text string used as a variable identifier; and
    a file name referenced in the source code file.

* * * * *